United States Patent
Schäfers et al.

(10) Patent No.: US 7,424,337 B2
(45) Date of Patent: Sep. 9, 2008

(54) METHOD FOR INCREASING THE CONTROL DYNAMICS OF A LOAD DRIVEN BY A DRIVESHAFT OF DIRECT DRIVE

(75) Inventors: Elmar Schäfers, Nürnberg (DE); Dietmar Stoiber, Fürth (DE); Hans-Peter Tröndle, Forchheim (DE); Bernd Wedel, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 376 days.

(21) Appl. No.: 10/960,752

(22) Filed: Oct. 7, 2004

(65) Prior Publication Data
US 2005/0093492 A1 May 5, 2005

(30) Foreign Application Priority Data
Oct. 8, 2003 (DE) ................. 103 46 680

(51) Int. Cl.
*H02P 5/46* (2006.01)
(52) U.S. Cl. .................. 700/170; 700/279; 318/66; 318/611
(58) Field of Classification Search ............ 318/66, 318/611; 700/170, 279
See application file for complete search history.

(56) References Cited

U.S. PATENT DOCUMENTS 4,349,233 A * 9/1982 Bullard et al. ........... 303/145

5,099,185 A 3/1992 Kono et al.

FOREIGN PATENT DOCUMENTS

| DE | 195 00 133 A1 | 8/1995 |
| EP | 1 052 093 B1 | 2/2003 |

OTHER PUBLICATIONS

"Digitale Regelung elektrischer Antriebe", Rolf Schonfeld, 2. edition 1990, ISBN 3-341-00852-7, pp. 203-219.*
"Regelung elektrischer Antriebe II", G. Pfaff, C. Meier, 3. edition 1992, ISBN 3-486-22376-3, pp. 204-214.*
"Digitale Regelung elektrischer Antriebe", Rolf Schönfeld, 2. edition 1990, ISBN 3-341-00852-7, pp. 203-219.
"Regelung elektrischer Antriebe II", G. Pfaff, C. Meier, 3. edition 1992, ISBN 3-486-22376-3, pp. 204-214.
"Control of Electrical Drives", W. Leonhard, 1985, ISBN 3-540-13650-9, pp. 290-295.
"Regelungstechnik", O. Föllinger, 1978, ISBN 3-87087-093-1, pp. 40 and 41.

* cited by examiner

*Primary Examiner*—Albert DeCady
*Assistant Examiner*—Tejal Gami
(74) *Attorney, Agent, or Firm*—Henry M. Feiereisen (57) ABSTRACT

In a method for increasing the control dynamics of a load driven by a direct drive via a driveshaft, a first transducer provides a first output signal indicating a first rotation speed, and a second transducer provides a second output signal indicating a second rotation speed. The direct drive is located between the first transducer and second transducer, with the second transducer being located in close proximity of the load. A mixed rotation speed is computed from a linear combination of the two rotation speed values, which is used as an actual control value of a controller of the direct drive. This method provides a very simple approach for increasing the control dynamics of a load driven by direct drive via a driveshaft.

16 Claims, 3 Drawing Sheets

METHOD FOR INCREASING THE CONTROL DYNAMICS OF A LOAD DRIVEN BY A DRIVESHAFT OF DIRECT DRIVE

CROSS-REFERENCES TO RELATED APPLICATIONS

This application claims the priority of German Patent Application, Serial No. 103 46 680.0, filed Oct. 8, 2003, pursuant to 35 U.S.C. 119(a)-(d), the disclosure of which is incorporated herein by reference.

BACKGROUND OF THE INVENTION

The present invention relates to a method for increasing the control dynamics of a load driven by a driveshaft of a direct drive, and more particularly to a method that suppresses resonances.

Nothing in the following discussion of the state of the art is to be construed as an admission of prior art.

In conventional control applications, the rotation speed of a direct drive, which is used as an input variable for controlling the driven load, is typically controlled by measuring the rotation speed either close to the load or close to the direct drive. In a direct-drive system, the driveshaft is directly mechanically connected both with the rotor of the direct drive and also with the driven load. Accordingly, no gear which could have slack and/or suppleness is interposed between the direct drive and the load.

Because the driveshaft has a finite stiffness, the driveshaft can vibrate during operation, for example, perform torsional oscillations. As a result, the rotation speed along the driveshaft is not constant. Depending on the location where the sensor measuring the rotation speed is located, the value of the measured rotation speed can vary more or less due to oscillations of the driveshaft. The amplitude of the oscillations can be particularly high in frequency ranges where mechanical resonances occur. The achievable control dynamics is particularly impaired in direct drive systems, where the dynamics of the system is determined by an adjustable amplification of the controller. The oscillations in the measured rotation speed of the driveshaft caused by the driveshaft oscillations must be filtered out in order to prevent control instabilities, before the rotation speed can be supplied as an actual control variable to a controller that controls the rotation speed of the driveshaft. Filtering which is typically performed in the range of the mechanical resonance frequency, can reduce the control dynamics. However, the control circuit will only be stable when the amplification of the control circuit is reduced.

To achieve an optimal control, a transducer should be arranged in the region of a so-called oscillation node on the driveshaft, i.e., in a region where the amplitude of oscillations has a minimum. This would obviate the need for filtering.

In practical applications, however, it is frequently not possible to attach a transducer near the oscillation node due to physical constraints. Moreover, the position of the oscillation node on the driveshaft can shift with the size of the load.

Methods for increasing the control dynamics of a drive train of a machine tool or production machine with backlash and/or suppleness are known. For example, the drive train can include a gear with backlash and/or suppleness, and the motor rotation speed and the load rotation speed are measured on both sides of the gear.

It would therefore be desirable and advantageous to provide an improved method for increasing the control dynamics of a load driven by a driveshaft of a direct drive, which obviates prior art shortcomings and is able to specifically operate with a high amplification without the need for a notch filter to filter out resonances.

SUMMARY OF THE INVENTION

According to one aspect of the invention, a method for increasing the control dynamics of a load driven by a driveshaft of a direct drive includes the steps of arranging the direct drive between a first transducer and a second transducer, wherein the second transducer is disposed proximate to the load, measuring an output signal from the first transducer to indicate a first rotation speed of the driveshaft, measuring an output signal from the second transducer to indicate a second rotation speed of the driveshaft, multiplying the first rotation speed with a first factor and the second rotation speed with a second factor to provide weighted first and second rotation speeds, adding the weighted first and second rotation speeds, determining from the added weighted rotation speeds a mixed rotation speed, and transmitting the mixed rotation speed as an actual control value to a controller that controls the direct drive.

According to another aspect of the invention, a method for increasing the control dynamics of a load driven by a driveshaft of a direct drive includes the steps of arranging the direct drive between a first transducer and a second transducer, wherein the second transducer is disposed proximate to the load, measuring an output signal from the first transducer to indicate a first rotation speed of the driveshaft, measuring an output signal from the second transducer to indicate a second rotation speed of the driveshaft, subtracting the first rotation speed from the second rotation speed and multiplying the difference with a first factor to provide a weighted rotation speed difference, adding the weighted rotation speed difference to the second rotation speed, determining from the added weighted rotation speed difference and weighted second rotation speed a mixed rotation speed, and transmitting the mixed rotation speed as an actual control value to a controller that controls the direct drive.

Additional aspects of the invention relate to a measurement device for increasing the control dynamics of a load that carries out the afore-described methods of the invention, and a machine tool or production machine with a measurement device of this type. It should be noted, however, that the method of the invention and the corresponding measurement device can also be used for other applications that require a high control dynamics of the control circuit of a driven load.

According to yet another aspect of the invention, a computer program operable on a control system for increasing the control dynamics of a load driven by a driveshaft of a direct drive can be stored on a data carrier, which can be a read/write medium. Such data carriers are commonly used for storing computer programs.

In one advantageous embodiment of the invention, the first factor can be a parameter $\alpha$ and the second factor can be a difference parameter $1-\alpha$. The control dynamics can be significantly improved by a suitable selection of the first and second factor as well as the parameter $\alpha$.

In yet another advantageous embodiment of the invention, the parameter $\alpha$ can be determined by solving an equation $$\sum_{f_i} \|\alpha \cdot G_{Path1}(j2\pi f_i) + (1-\alpha) \cdot G_{Path2}(j2\pi f_i)\| = \min,$$

wherein ‖ ‖ represents a distance function computed as a square of a magnitude or as a magnitude of a complex expression ($\alpha \cdot G_{Path1}(j2\pi f_i) + (1-\alpha) \cdot G_{Path2}(j2\pi f_i)$), with $G_{Path1}(j2\pi f)$ representing a frequency response of the controller at $\alpha=1$, and $G_{Path2}(j2\pi f)$ representing a frequency response of the controller at $\alpha=0$, and with $f_i$ representing support points in frequency space. The parameter $\alpha$ can thereby be determined in a particularly efficient manner.

In still another advantageous embodiment, the subtracting, multiplying and adding operations used to determine the mixed rotation speed can be performed in the controller. Because modern drives are typically controlled by software executed on a microprocessor system, any necessary additions, subtractions and multiplications can hence be performed by the controller, which obviates the need for additional hardware when implementing the method of the invention. However, a separate control system, which can also be implemented in form of software executed on a microprocessor, can also be used for performing the necessary additions, subtractions and multiplications.

According to another advantageous embodiment of the invention, at least one of the first and second transducers can be an angular encoder, wherein the corresponding first rotation speed and second rotation speed can be determined from a measured rotation angle of the corresponding angular encoder. Angular encoders which output an angular position are commonly employed transducers.

According to yet another advantageous embodiment, at least one of the first and second transducer can be a tachometer that directly outputs an angular rotation speed. Tachometers advantageously output the rotation speed directly, so that the rotation speed need not be determined by forming the difference between rotation angles, as is required with angular encoders.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
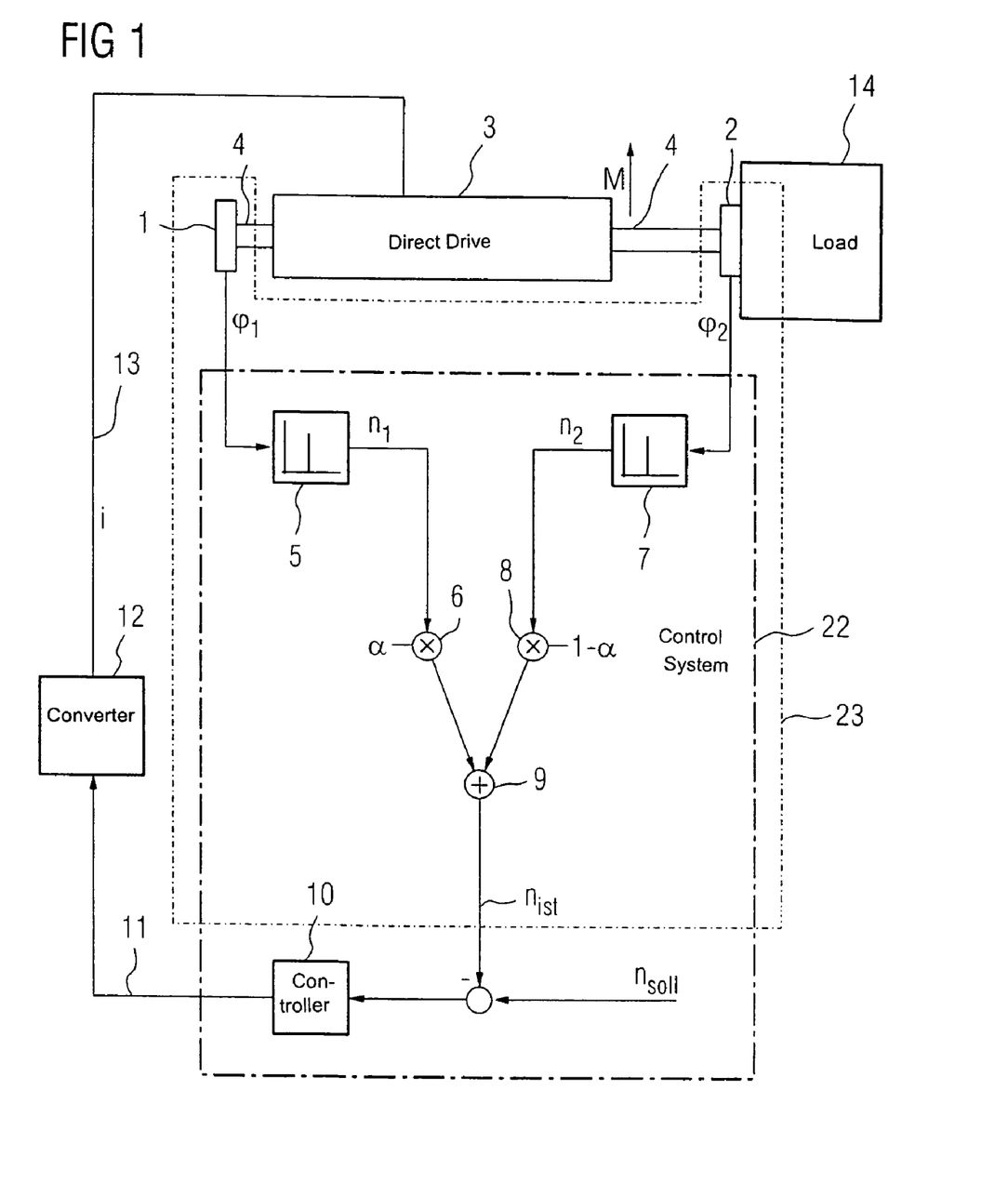
FIG. 1 shows a schematic flow diagram of a first embodiment of a method for increasing the control dynamics of a driven load according to the invention.

Turning now to the drawing, and in particular to FIG. 1, there is shown in form of a block diagram a first embodiment of the method of the invention. A direct drive, which in the depicted exemplary embodiment is implemented as a torque motor 3, drives a load 14 via a driveshaft 4. A first transducer 1 measuring the rotation speed of the driveshaft 4 is positioned on or in the vicinity of the end of the driveshaft 4 facing the motor, i.e., facing away from the load 14. A second transducer 2 measuring a second rotation speed of the driveshaft is disposed on the end of the driveshaft 4 facing the load, as close to the load 14 as possible. In the embodiment depicted in FIG. 1, the first transducer 1 and the second transducer 2 can be implemented as angular encoders that output an output signal representing rotation angles $\phi_1$ and $\phi_2$. A differentiator 5 forms the first derivative of the first measured rotation angle $\phi_1$, resulting in a signal proportional to the rotation speed, which is then multiplied by a factor $1/2\pi$ to indicate a first rotation speed in form of a rotational speed value $n_1$.

Another differentiator 7 forms the first derivative of the second measured rotation angle $\phi_2$ to form a signal proportional to the rotation speed, which is then multiplied by a factor $1/2\pi$ to indicate a second rotation speed in form of a rotational speed value $n_2$. It should be noted that the corresponding rotation speed can also be provided directly in the form of an angular rotation speed $\dot\phi_1$ and $\dot\phi_2$, respectively, so that the multiplication by the factor $1/2\pi$ can be omitted after the differentiation, i.e., the rotation angle is only differentiated with respect to time.

Moreover, the first transducer 1 and the second transducer 2 can also be implemented as tachometers which output a rotation speed directly. With this approach, the differentiators 5 and 7 can be omitted.

The rotational speed value $n_1$ is multiplied in multiplier 6 with a factor $\alpha$, and the rotational speed value $n_2$ is multiplied in multiplier 8 with a factor $1-\alpha$. The rotational speed values weighted in this manner are added in an adder 9, resulting in a mixed rotation speed in the form of a mixed rotational speed value $n_{ist}$ that used by the controller 10 for controlling the direct drive. The difference between a desired rotational speed value $n_{soll}$ and the mixed rotational speed value $n_{ist}$ is supplied to the controller 10 which controls a converter 12 via a connection 11. The converter 12 provides the drive current i to the torque motor 3 via a connection 13.

The present invention solves the problem by computing the linear combination of the two output signals of the transducer as a mixed rotation speed which approximates the rotation speed that could be measured directly at the oscillation node. The mixed rotation speed is then used as actual control variable which obviates the need for filtering, in particular in a frequency range where mechanical resonances can occur. This makes it possible to set the control amplification to a higher value and thereby increase the control dynamics.

It is not necessary to compute the weighted rotational speed values $n_1$ and $n_2$ by multiplication with a factor $\alpha$ or $1-\alpha$, respectively, and other factors can be used for linearly combining the two transducer signals. However, the selection of the factors $\alpha$ and $1-\alpha$ makes the subsequent computation of the factor $\alpha$ particularly simple.

The differentiators 5 and 7, the multipliers 6 and 8, the adder 9 as well as the controller 10 represent components of a control system 22 of the drive system. Because the controller and/or the control system are typically implemented in the form of software executed on a microprocessor system, the required addition, subtraction and multiplication for determining the mixed rotation speed in the controller or control system can advantageously also be performed by the microprocessor, which obviates the need for additional hardware components, with the exception of additional transducers.

The first transducer 1, the second transducer 2, the two differentiators 5 and 7, the two multipliers 6 and 8, as well as the adder 9 form a measurement device 23 for carrying out the method of the invention. As mentioned above, the two differentiators 5 and 7 can be omitted from the measurement device 23 when tachometers are used that output the rotation speed directly.

Figure 2:
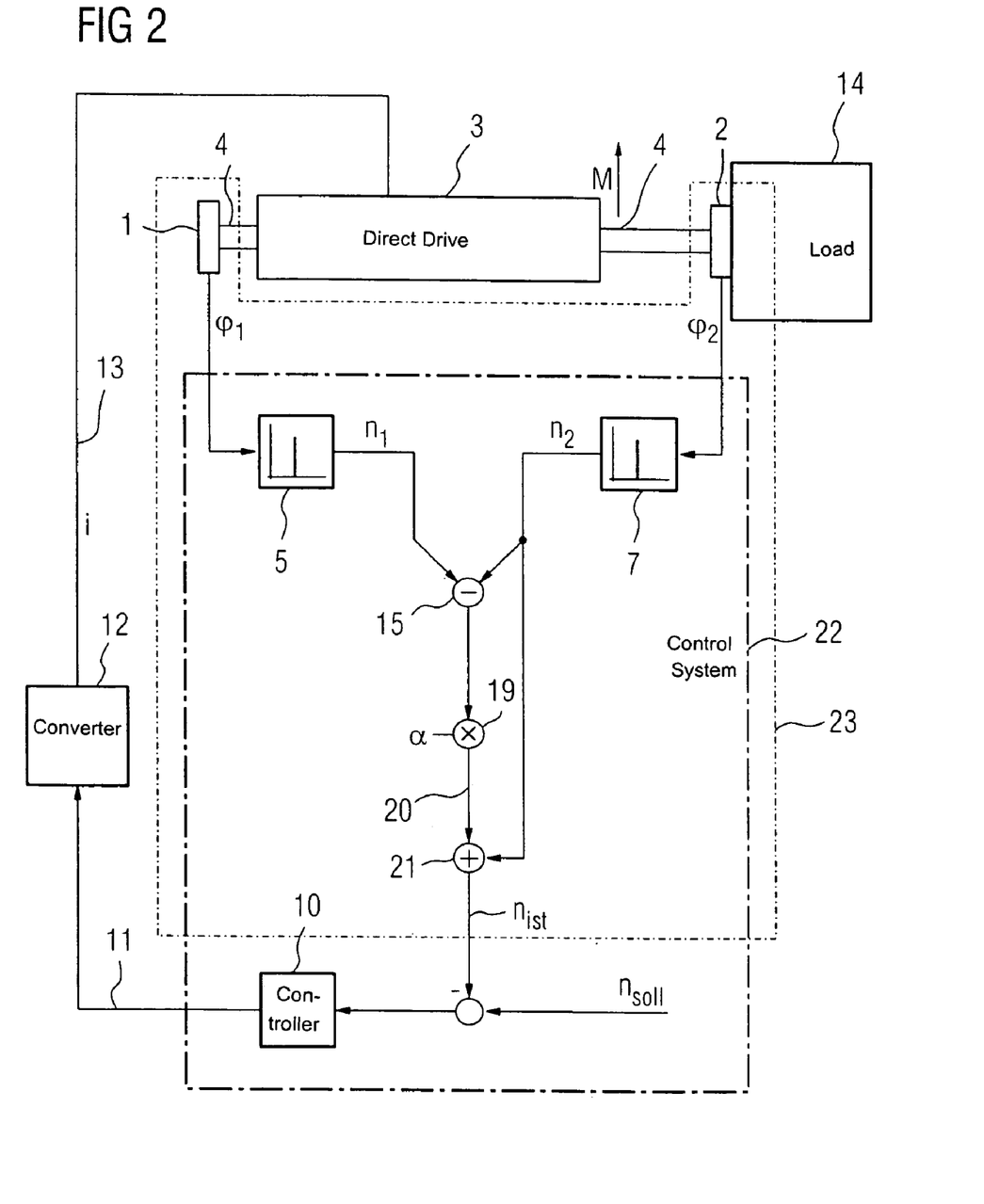
FIG. 2 shows a schematic flow diagram of a second embodiment of a method for increasing the control dynamics of a driven load according to the invention.

FIG. 2 shows in form of a schematic block diagram a second embodiment of the invention. The embodiment depicted in FIG. 2 is similar to the embodiment described above with reference to FIG. 1, and the same reference numbers are used for identical components. The common components will therefore not be described again. However, the embodiment of FIG. 2 uses a linear combination of the two rotational speed values $n_1$ and $n_2$ that is different from the embodiment of FIG. 1.

In the embodiment of FIG. 2, the difference between the rotational speed values $n_1$ and $n_2$ is formed in a subtracter 15 and the difference is weighted by a factor $\alpha$. The weighted difference 20 and the rotational speed value $n_2$ are added in an adder 21, and a mixed rotation speed in form of the mixed rotational speed value $n_{ist}$ is determined as a control variable for the controller 10 of the direct drive.

The two different linear combinations used for determining the mixed rotation speed in the two exemplary embodiments depicted in FIG. 1 and FIG. 2 can be mathematically transformed into each other, yielding the same actual rotational speed value $n_{ist}$ for both embodiments.

The first transducer 1, the second transducer 2, the two differentiators 5 and 7, the subtracter 15, the multiplier 19, as well as the adder 21 form according to FIG. 2 a measurement device 23 for carrying out the method of the invention. As mentioned above, the two differentiators 5 and 7 can be omitted when using tachometers in the measurement device 23 for directly outputting the rotation speed.

The parameter $\alpha$ can be determined either empirically or from two specific frequency responses of the rotation speed control system that controls the load 14. In a first measurement, the frequency response of the rotation speed control system is measured for $\alpha=1$, i.e., only the signal of the first transducer 1 is used as an actual input value of the rotation speed control system. Subsequently, the frequency response of the rotation speed control system is measured at $\alpha=0$, i.e., only the output signal of the angular encoder 2 is used as an actual input value of the rotation speed control system. The input valuable used in both measurements for measuring the respective frequency response is the motor torque M which is measured by a sensor or transducer that is not shown in FIG. 1 or FIG. 2 for sake of clarity. Alternatively, the motor current i, which is proportional to the motor torque M, can be used instead of the actual motor torque M. The measured rotation speed $n_1$, and $n_2$, respectively, represents the initial value. The two frequency responses for $\alpha=0$ and $\alpha=1$ can be calculated from the measured quantities using conventional mathematical methods for estimating a spectral response, for example, autocorrelation, cross-correlation or Fourier transformation. The frequency response of the rotation speed control system $G_{Path1}(j2\pi f)$ measured with $\alpha=1$ then becomes:

$$G_{Path1}(j2\pi f) = \frac{n_1(j2\pi f)}{M(j2\pi f)} \text{ with } \alpha = 1 \quad (1)$$

The frequency response of the rotation speed control system $G_{Path2}(j2\pi f)$ measured with $\alpha=0$ then becomes:

$$G_{Path2}(j2\pi f) = \frac{n_2(j2\pi f)}{M(j2\pi f)} \text{ with } \alpha = 0 \quad (2)$$

wherein f is rotation frequency, and j is imaginary unit.

The effective total frequency response $G(j2\pi f)$ of the rotation speed control system then becomes with the parameter $\alpha$:

$$G(j2\pi f) = \alpha \cdot G_{Path1}(j2\pi f) + (1-\alpha) \cdot G_{Path2}(j2\pi f) \quad (3)$$

The total frequency response G for arbitrary values of $\alpha$ can now be determined from the two measurements, and the parameter $\alpha$ can be determined so as to provide an optimal effective total frequency response $G(j2\pi f)$ for the control system. It is desirable to minimize the effect of potential resonances by selecting a suitable linear combination of the two frequency responses $G_{Path1}(j2\pi f)$ and $G_{Path2}(j2\pi f)$, weighted by the parameter $\alpha$. The parameter $\alpha$ can then be determined from the following equation:

$$\sum_{f_i} \|\alpha \cdot G_{Path1}(j2\pi f_i) + (1-\alpha) \cdot G_{Path2}(j2\pi f_i)\| = \min \quad (4)$$

wherein min indicates minimum, i.e., the magnitude of the expression $$\sum_{f_i} \|\alpha \cdot G_{Path1}(j2\pi f_i) + (1-\alpha) \cdot G_{Path2}(j2\pi f_i)\|$$

should be minimized, whereby the square of the absolute value or the absolute value of the complex expression $(\alpha \cdot G_{Path1}(j2\pi f_i) + (1-\alpha) \cdot G_{Path2}(j2\pi f_i))$ can be used as a distance function $\| \, \|$, with $f_i$ representing support points in frequency space.

Advantageously, the frequency support points $f_i$ can be selected from the range of frequencies that should be suppressed, i.e., frequencies close to resonance frequencies.

Figure 3:
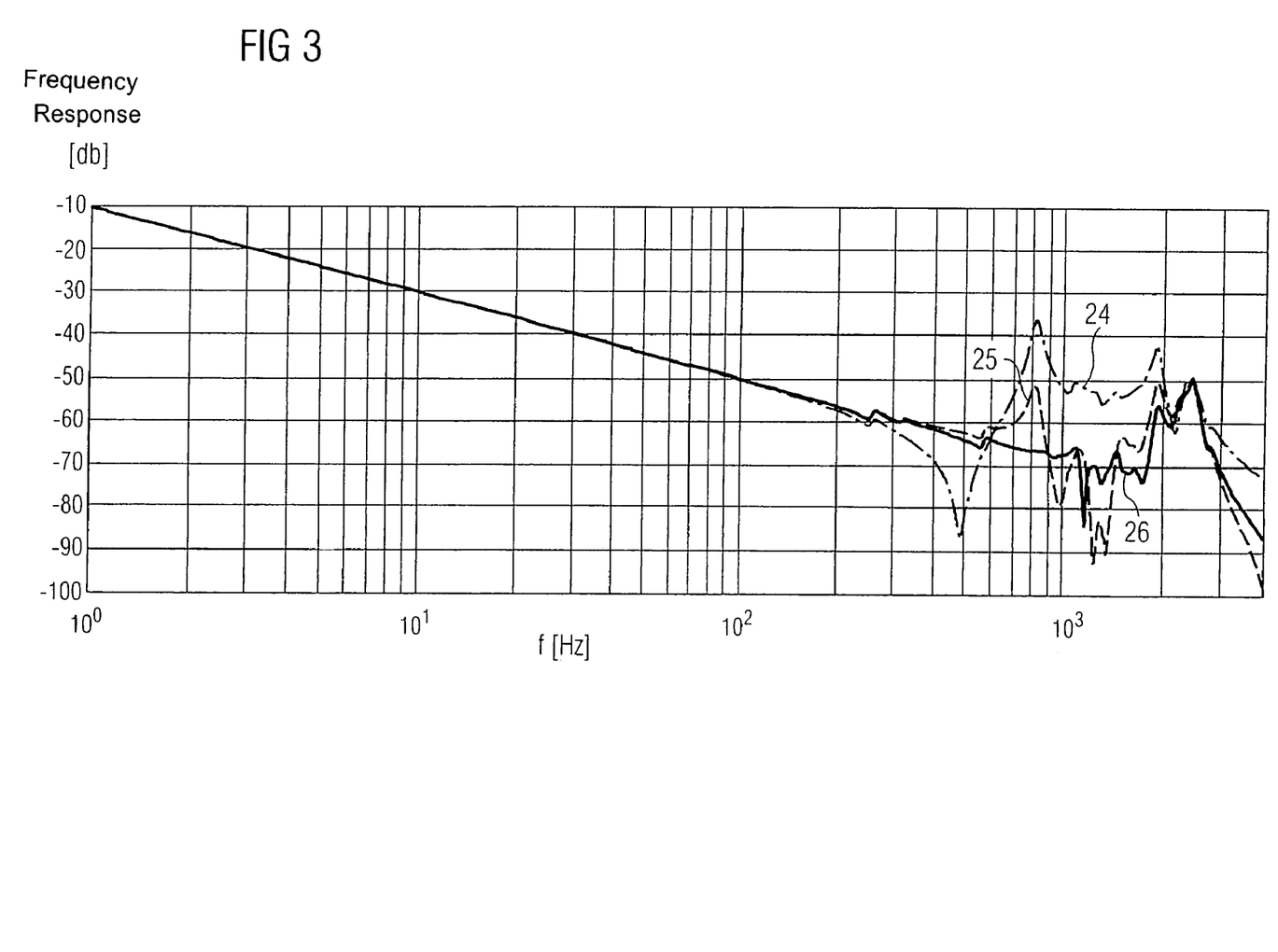
FIG. 3 shows three different frequency responses of the controlled system according to the invention.

FIG. 3 shows frequency responses of a rotation speed control system operating according to the method of the invention. In the curves depicted in FIG. 3, the magnitude of the corresponding frequency responses is plotted as a function of the frequency f. The curve 24 shows the magnitude (absolute value) of the frequency response of $G_{Path1}(j2\pi f)$, whereas curve 25 shows the magnitude of the frequency response of $G_{Path2}(j2\pi f)$. The solid curve 26 shows the magnitude of the frequency response of $G(j2\pi f)$ of the control system for $\alpha=0.15$. The value for $\alpha$ is determined by solving equation (4) above.

As seen in FIG. 3, the resonance at approximately 800 Hz causes a noticeable increase in the magnitude of the frequency response of $G_{Path1}(j2\pi f)$ and $G_{Path2}(j2\pi f)$. The frequency support points $f_i$ are therefore selected in a frequency range around the resonance frequency that is to be suppressed. In the depicted exemplary embodiment, the frequency support points are selected between 700 Hz and 900 Hz, with a separation between adjacent frequency support points $f_i$ of 4 Hz. The effect of the interfering resonance is then no longer evident in the total frequency response $G(j2\pi f)$.

Machine tools in the context of the present invention can also include, for example, uniaxial or multi-axis lathes, milling machines, as well as drilling or grinding machines.

Machine tools can further include processing centers, linear and rotary transfer machines, laser machines, rolling machines and/or gear cutters. These machines have in common that the material is machined along several axes. Production machines in the context of the present invention can include textile, paper, plastic, wood, glass, ceramic or stone processing machines, as well as machines used for forming, packaging, printing, conveying, lifting, pumping, transporting. Furthermore, fans, blowers, wind turbines, lifting gear, cranes, robots, production and assembly lines are also included under the term production machines in the context of the present invention.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for increasing the control dynamics of a load driven by a driveshaft directly connecting the load to a direct drive without an interposed gear, comprising the steps of:
   arranging the direct drive between a first transducer and a second transducer, said first transducer being disposed proximate to the direct drive and said second transducer being disposed proximate to the load;
   measuring an output signal from the first transducer to indicate a first rotation speed of the driveshaft;
   measuring an output signal from the second transducer to indicate a second rotation speed of the driveshaft;
   multiplying the first rotation speed with a first factor and the second rotation speed with a second factor to provide weighted first and second rotation speeds, wherein the first factor is a parameter $\alpha$ and the second factor is a difference parameter $1-\alpha$, wherein the parameter $\alpha$ is determined by solving an equation $$\sum_{f_i} \|\alpha \cdot G_{Path1}(j2\pi f_i) + (1-\alpha) \cdot G_{Path2}(j2\pi f_i)\| = \min,$$

wherein $\| \; \|$ represents a distance function computed as a square of a magnitude or as a magnitude of a complex expression ($\alpha \cdot G_{Path1}(j2\pi f_i) + (1-\alpha) \cdot G_{Path2}(j2\pi f_i)$), with $G_{Path1}(j2\pi f)$ representing a frequency response of the controller at $\alpha=1$, and $G_{Path2}(j2\pi f)$ representing a frequency response of the controller at $\alpha=0$, and with $f_i$ representing support points in frequency space;
   adding the weighted first and second rotation speeds;
   determining from the added weighted rotation speeds a mixed rotation speed; and
   transmitting the mixed rotation speed as a controlled actual value to a controller that controls the direct drive.

2. A method for increasing the control dynamics of a load driven by a driveshaft directly connecting the load to a direct drive without an interposed gear, comprising the steps of:
   arranging the direct drive between a first transducer and a second transducer, said first transducer being disposed proximate to the direct drive and said second transducer being disposed proximate to the load;
   measuring an output signal from the first transducer to indicate a first rotation speed of the driveshaft;
   measuring an output signal from the second transducer to indicate a second rotation speed of the driveshaft;
   subtracting the first rotation speed from the second rotation speed and multiplying the difference with a first factor to provide a weighted rotation speed difference;
   adding the weighted rotation speed difference to the second rotation speed;
   determining from the added weighted rotation speed difference and weighted second rotation speed a mixed rotation speed; and
   transmitting the mixed rotation speed as a controlled actual value to a controller that controls the direct drive,
   wherein the first factor is a parameter $\alpha$ determined by solving an equation $$\sum_{f_i} \|\alpha \cdot G_{Path1}(j2\pi f_i) + (1-\alpha) \cdot G_{Path2}(j2\pi f_i)\| = \min,$$

wherein $\| \; \|$ represents a distance function computed as a square of a magnitude or as a magnitude of a complex expression ($\alpha \cdot G_{Path1}(j2\pi f_i) + (1-\alpha) \cdot G_{Path2}(j2\pi f_i)$), with $G_{Path1}(j2\pi f)$ representing a frequency response of the controller at $\alpha=1$, and $G_{Path2}(j2\pi f)$ representing a frequency response of the controller at $\alpha=0$, and with $f_i$ representing support points in frequency response space.

3. The method of claim 1, wherein the multiplying and adding operations used to determine the mixed rotation speed are performed in the controller.

4. The method of claim 2, wherein the subtracting, multiplying and adding operations used to determine the mixed rotation speed are performed in the controller.

5. The method of claim 1, wherein at least one of the first and second transducers is an angular encoder, and wherein the corresponding first rotation speed and second rotation speed is determined from a measured rotation angle of the corresponding angular encoder.

6. The method of claim 2, wherein at least one of the first and second transducers is an angular encoder, and wherein the corresponding first rotation speed and second rotation speed is determined from a measured rotation angle of the corresponding angular encoder.

7. The method of claim 1, wherein at least one of the first and second transducer is a tachometer that directly outputs an angular rotation speed.

8. The method of claim 2, wherein at least one of the first and second transducer is a tachometer that directly outputs an angular rotation speed.

9. A measurement device for increasing the control dynamics of a load, comprising:
   a direct drive having a driveshaft driving the load without an interposed gear;
   a first transducer disposed on a first end of the driveshaft proximate to the direct drive and indicating a first rotation speed of the driveshaft;
   a second transducer disposed on a second end of the driveshaft proximate to the load and indicating a second rotation speed of the driveshaft;
   a first multiplier multiplying the first rotation speed with a first factor to provide a weighted first rotation speed;
   a second multiplier multiplying the second rotation speed with a second factor to provide a weighted second rotation speed, wherein the first factor is a parameter α and the second factor is a difference parameter 1−α, wherein the parameter α is determined by solving an equation $$\sum_{f_i} \|\alpha \cdot G_{Path1}(j2\pi f_i) + (1-\alpha) \cdot G_{Path2}(j2\pi f_i)\| = \min,$$

wherein ‖ ‖ represents a distance function computed as a square of a magnitude or as a magnitude of a complex expression (α·$G_{Path1}$(j2πf$_i$)+(1−α)·$G_{Path2}$(j2πf$_i$)), with $G_{Path1}$(j2πf) representing a frequency response of the controller at α=1, and $G_{Path2}$(j2πf) representing a frequency response of the controller at α=0, and with f$_i$ representing support points in frequency space;
    an adder adding the weighted first and second rotation speeds to determine from the added weighted rotation speeds a mixed rotation speed; and
    a controller receiving at least the mixed rotation speed for controlling the direct drive.

10. A measurement device for increasing the control dynamics of a load, comprising:
    a direct drive having a driveshaft driving the load without an interposed gear;
    a first transducer disposed on a first end of the driveshaft proximate to the direct drive and indicating a first rotation speed of the driveshaft;
    a second transducer disposed on a second end of the driveshaft proximate to the load and indicating a second rotation speed of the driveshaft;
    a subtracter subtracting the first rotation speed from the second rotation speed;
    a multiplier multiplying the difference with a weighting factor to provide a weighted rotation speed difference;
    an adder adding the weighted rotation speed difference to the second rotation speed to determine from the added weighted rotation speed difference and weighted second rotation speed a mixed rotation speed; and
    a controller receiving at least the mixed rotation speed for controlling the direct drive,
    wherein the weighting factor is a parameter α determined by solving an equation $$\sum_{f_i} \|\alpha \cdot G_{Path1}(j2\pi f_i) + (1-\alpha) \cdot G_{Path2}(j2\pi f_i)\| = \min,$$

wherein ‖ ‖ represents a distance function computed as a square of a magnitude or as a magnitude of a complex expression (α·$G_{Path1}$(j2πf$_i$)+(1−α)·$G_{Path2}$(j2πf$_i$)), with $G_{Path1}$(j2πf) representing a frequency response of the controller at α=1, and $G_{Path2}$(j2πf) representing a frequency response of the controller at α=0, and with f$_i$ representing support points in frequency space.

11. The device of claim 9, wherein at least one of the first and second transducers is a tachometer that indicates an angular rotation speed.

12. The device of claim 10, wherein at least one of the first and second transducers is a tachometer that indicates an angular rotation speed.

13. The device of claim 9, wherein at least one of the first and second transducers is an angular encoder, and further including a differentiator that determines a corresponding rotation speed from a measured rotation angle of the corresponding angular encoder.

14. The device of claim 10, wherein at least one of the first and second transducers is an angular encoder, and further including a differentiator that determines a corresponding rotation speed from a measured rotation angle of the corresponding angular encoder.

15. A machine tool or production machine with a measurement device for increasing the control dynamics of a load, said measurement device comprising:
    a direct drive having a driveshaft driving the load without an interposed gear;
    a first transducer disposed on a first end of the driveshaft proximate to the direct drive and indicating a first rotation speed of the driveshaft;
    a second transducer disposed on a second end of the driveshaft proximate to the load and indicating a second rotation speed of the driveshaft;
    a first multiplier multiplying the first rotation speed with a first factor to provide a weighted first rotation speed;
    a second multiplier multiplying the second rotation speed with a second factor to provide a weighted second rotation speed, wherein the first factor is a parameter α and the second factor is a difference parameter 1−α, wherein the parameter α is determined by solving an equation $$\sum_{f_i} \|\alpha \cdot G_{Path1}(j2\pi f_i) + (1-\alpha) \cdot G_{Path2}(j2\pi f_i)\| = \min,$$

wherein ‖ ‖ represents a distance function computed as a square of a magnitude or as a magnitude of a complex expression (α·$G_{Path1}$(j2πf$_i$)+(1−α)·$G_{Path2}$(j2πf$_i$)), with $G_{Path1}$(j2πf) representing a frequency response of the controller at α=1, and $G_{Path2}$(j2πf) representing a frequency response of the controller at α=0, and with f$_i$ representing support points in frequency space;
    an adder adding the weighted first and second rotation speeds to determine from the added weighted rotation speeds a mixed rotation speed; and
    a controller receiving at least the mixed rotation speed for controlling the direct drive.

16. A machine tool or production machine with a measurement device for increasing the control dynamics of a load, said measurement device comprising:
    a direct drive having a driveshaft driving the load without an interposed gear;
    a first transducer disposed on a first end of the driveshaft proximate to the direct drive and indicating a first rotation speed of the driveshaft;
    a second transducer disposed on a second end of the driveshaft proximate to the load and indicating a second rotation speed of the driveshaft;
    a subtracter subtracting the first rotation speed from the second rotation speed;
    a multiplier multiplying the difference with a weighting factor to provide a weighted rotation speed difference;
    an adder adding the weighted rotation speed difference to the second rotation speed to determine from the added weighted rotation speed difference and weighted second rotation speed a mixed rotation speed; and
    a controller receiving at least the mixed rotation speed for controlling the direct drive,
    wherein the weighting factor is a parameter α determined by solving an equation $$\sum_{f_i} \|\alpha \cdot G_{Path1}(j2\pi f_i) + (1-\alpha) \cdot G_{Path2}(j2\pi f_i)\| = \min,$$

wherein $\| \ \|$ represents a distance function computed as a square of a magnitude or as a magnitude of a complex expression $(\alpha \cdot G_{Path1}(j2\pi f_i) + (1-\alpha) \cdot G_{Path2}(j2\pi f_i))$, with $G_{Path1}(j2\pi f)$ representing a frequency response of the controller at $\alpha=1$, and $G_{Path2}(j2\pi f)$ representing a frequency response of the controller at $\alpha=0$, and with $f_i$ representing support points in frequency space.

* * * * *

UNITED STATES PATENT AND TRADEMARK OFFICE
CERTIFICATE OF CORRECTION

| | |
|---|---|
| PATENT NO. | : 7,424,337 B2 |
| APPLICATION NO. | : 10/960752 |
| DATED | : September 9, 2008 |
| INVENTOR(S) | : Elmar Schäfers et al. |

It is certified that error appears in the above-identified patent and that said Letters Patent is hereby corrected as shown below:

On the Title Page, Item [75] Inventors:

Change first inventor's city of residence from "Nümberg" to --Nürnberg--;
Change fourth inventor's city of residence from "Nümberg" to --Nürnberg.--

Signed and Sealed this

Thirtieth Day of December, 2008

JON W. DUDAS
*Director of the United States Patent and Trademark Office*